US012587240B2

(12) United States Patent
Yin et al.

(10) Patent No.: US 12,587,240 B2
(45) Date of Patent: Mar. 24, 2026

(54) NON-TERRESTRIAL NETWORK USER EQUIPMENT DOWNLINK RECEPTION TIME INDICATION WITH BEAM GROUPS AND/OR BEAM PATTERNS

(71) Applicant: Sharp Kabushiki Kaisha, Sakai City (JP)

(72) Inventors: Zhanping Yin, Vancouver, WA (US); Tomoki Yoshimura, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 127 days.

(21) Appl. No.: 18/430,362

(22) Filed: Feb. 1, 2024

(65) Prior Publication Data

US 2025/0253899 A1     Aug. 7, 2025

(51) Int. Cl.
| | |
|---|---|
| *H04B 7/04* | (2017.01) |
| *H04B 7/0408* | (2017.01) |
| *H04W 72/044* | (2023.01) |
| *H04W 72/0446* | (2023.01) |

(52) U.S. Cl.
CPC ...... *H04B 7/0408* (2013.01); *H04W 72/0446* (2013.01); *H04W 72/046* (2013.01)

(58) Field of Classification Search
CPC ............ H04B 7/0408; H04W 72/0446; H04W 72/046
USPC ........................................ 375/260, 262, 299
See application file for complete search history.

(56) References Cited

U.S. PATENT DOCUMENTS

| | | | | |
|---|---|---|---|---|
| 7,133,377 B1* | 11/2006 | Mullins | .............. | H04B 7/18534 |
| | | | | 370/321 |
| 8,155,640 B1* | 4/2012 | Battista | ................. | H04W 72/21 |
| | | | | 370/347 |
| 2002/0028668 A1* | 3/2002 | Grayson | ............ | H04B 7/18532 |
| | | | | 370/347 |
| 2018/0115958 A1* | 4/2018 | Raghavan | ........... | H04W 64/006 |
| 2019/0081673 A1* | 3/2019 | Athley | ................... | H04B 7/088 |
| 2021/0227550 A1 | 7/2021 | Ly et al. | | |
| 2023/0275715 A1* | 8/2023 | Paz | ....................... | H04L 5/0007 |
| | | | | 370/329 |
| 2023/0300846 A1* | 9/2023 | Choi | ..................... | H04W 72/23 |
| | | | | 370/329 |
| 2024/0015704 A1* | 1/2024 | Niu | ........................ | H04L 5/1469 |
| 2024/0187085 A1* | 6/2024 | Mcmenamy | ....... | H04B 7/15507 |
| 2024/0372609 A1* | 11/2024 | Rico Alvarino | ...... | H04L 5/0051 |
| 2025/0141535 A1* | 5/2025 | Liu | .................... | H04B 7/18513 |
| 2025/0193716 A1* | 6/2025 | Chatterjee | ............. | H04W 24/08 |

OTHER PUBLICATIONS

Huawei (Moderator, RAN1 Vice-Chair), "New WID: Non-Terrestrial Networks (NTN) for NR Phase 3", 3GPP TSG RAN Meeting #102, RP-234078, Dec. 15, 2023.

* cited by examiner

*Primary Examiner* — Emmanuel Bayard
(74) *Attorney, Agent, or Firm* — Austin Rapp

(57) ABSTRACT

A user equipment (UE) is described. The UE includes receiving circuitry configured to monitor SSBs/PBCHs (synchronization signal blocks/physical broadcast channels) and obtain system information block type 1 (SIB1) information. The receiving circuitry is further configured to receive downlink (DL) control information on a DL reception timeslot pattern indication and to receive DL signals and detect potential data to the UE in indicated timeslots following the DL reception timeslot pattern.

11 Claims, 12 Drawing Sheets

201

Beam

200

202

NON-TERRESTRIAL NETWORK USER EQUIPMENT DOWNLINK RECEPTION TIME INDICATION WITH BEAM GROUPS AND/OR BEAM PATTERNS

TECHNICAL FIELD

The present disclosure relates generally to communication systems. More specifically, the present disclosure relates to beam group and/or beam pattern designs for non-terrestrial network downlink coverage enhancement.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
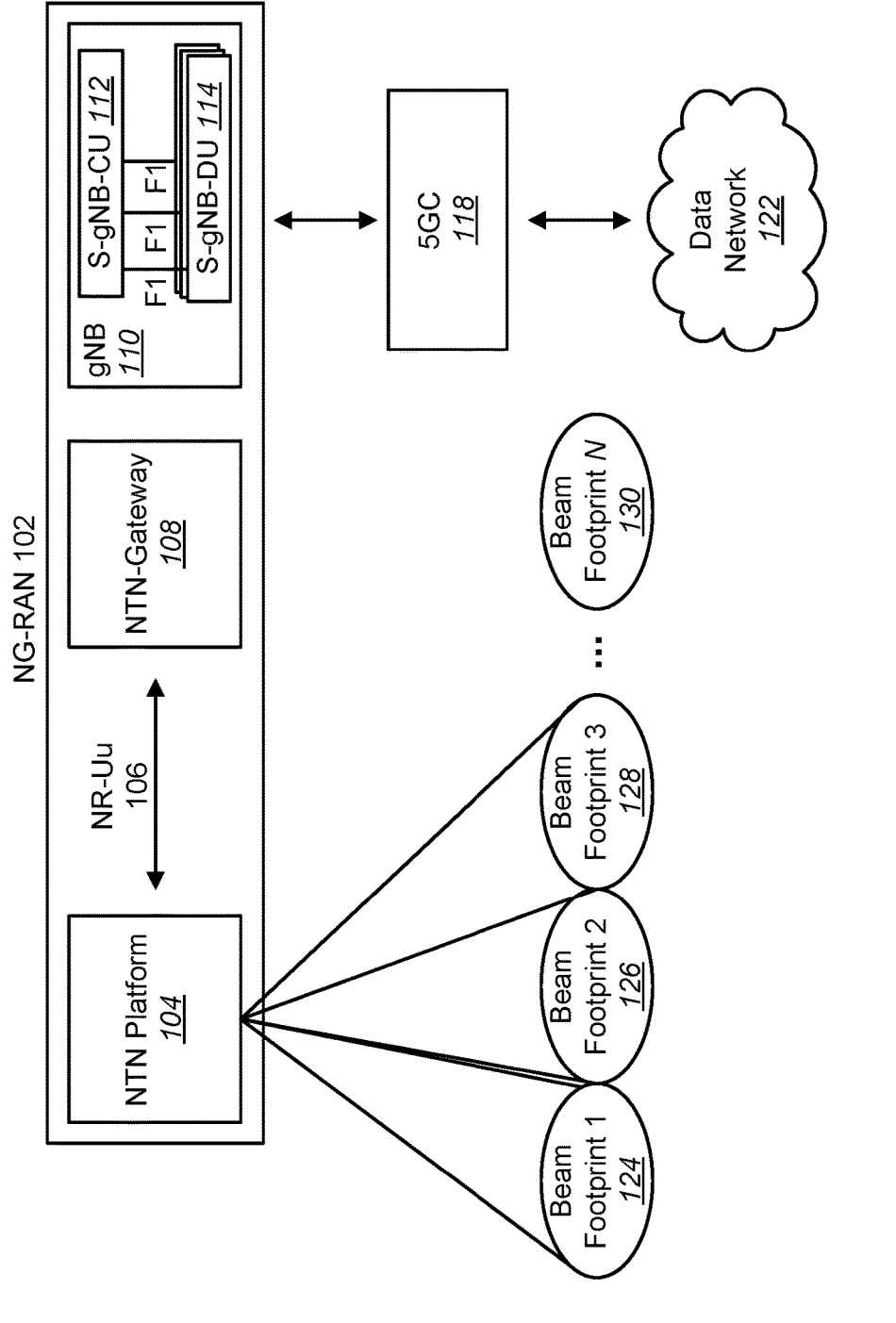
FIG. 1 is a diagram illustrating an example of a non-terrestrial network (NTN) coverage area.

A user equipment (UE) is described. The UE includes receiving circuitry configured to monitor SSBs/PBCHs (synchronization signal blocks/physical broadcast channels) and obtain system information block type 1 (SIB1) information. The receiving circuitry is further configured to receive downlink (DL) control information on a DL reception timeslot pattern indication and to receive DL signals and detect potential data to the UE in indicated timeslots following the DL reception timeslot pattern.

In some examples, a timeslot in the DL reception timeslot pattern is configured with a granularity of a slot, or a number of slots, or a number of symbols. The DL reception timeslot pattern indication may include a periodicity in a number of timeslots, and one or more timeslot offset indexes of the timeslots within the periodicity for DL reception.

The DL reception timeslot pattern indication may be defined as a bitmap. The length of the bitmap may be a periodicity. In addition, each bit in the bitmap may indicate whether the UE should monitor the timeslot. In some examples, in the bitmap of the DL reception timeslot pattern indication, a bit of 1 indicates the UE is to monitor the timeslot for DL reception, and a bit of 0 indicates the UE does not need to monitor the timeslot for DL reception.

A base station (gNB) is also described. The gNB includes transmitting circuitry configured to transmit SSBs/PBCHs (synchronization signal blocks/physical broadcast channels) and to configure downlink (DL) control information on a DL reception timeslot pattern indication for a beam group and/or beam pattern. The transmitting circuitry is also configured to schedule and transmit DL signals to user equipments (UEs) in beams in the beam group and/or beam pattern following the DL reception timeslot pattern.

A method by a user equipment (UE) is also described. The method includes monitoring SSBs/PBCHs (synchronization signal blocks/physical broadcast channels) and obtaining system information block type 1 (SIB1) information. The method also includes receiving downlink (DL) control information on a DL reception timeslot pattern indication and receiving DL signals. Further, the method includes detecting potential data to the UE in indicated timeslots following the DL reception timeslot pattern.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a wireless terminal, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a wireless terminal. However, as the scope of the present disclosure should not be limited to the 3GPP standards, the terms "wireless terminal" and "wireless communication device" may be used interchangeably herein to mean the more general term "wireless communication device." A wireless terminal may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a wireless terminal. It should also be noted that in E-UTRA and E-UTRAN overall description, as used herein, a "cell" may be defined as "combination of downlink and optionally uplink resources." The linking between the carrier frequency of the downlink (DL) resources and the carrier frequency of the uplink resources may be indicated in the system information transmitted on the downlink resources.

"Configured cells" are those cells of which the wireless terminal is aware and is allowed by an eNB to transmit or receive information. "Configured cell(s)" may be serving cell(s). The wireless terminal may receive system information and perform the required measurements on all configured cells. "Configured cell(s)" for a radio connection may include a primary cell and/or no, one, or more secondary cell(s). "Activated cells" are those configured cells on which the wireless terminal is transmitting and receiving. That is, activated cells are those cells for which the wireless terminal monitors the physical downlink control channel (PDCCH) and in the case of a downlink transmission, those cells for which the wireless terminal decodes a physical downlink shared channel (PDSCH). "Deactivated cells" are those configured cells that the wireless terminal is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time, frequency and/or space resources to allow for enhanced mobile broadband (eMBB) communication and ultra-reliable low-latency communication (URLLC) services, as well as massive machine type communication (MMTC) like services. To meet a latency target and high reliability, mini-slot-based repetitions with flexible transmission occasions may be supported. Approaches for applying mini-slot-based repetitions are described herein. A new radio (NR) base station may be referred to as a gNB. A gNB may also be more generally referred to as a base station device.

One important objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such environments may include, for example, pressure sensors, humidity sensors, thermometers, motion sensors, accelerometers, actuators, etc. It is desirable to connect these sensors and actuators to 5G networks and core. The massive industrial wireless sensor network (IWSN) use cases and requirements include not only URLLC services with very high requirements, but also relatively low-end services with the requirement of small device form factors, and/or being completely wireless with a battery life of several years. The requirements for these services that are higher than low power wide area (LPWA) (e.g., LTE-MTC and/or Narrowband Internet of Things (LTE-M/NB-IOT)) but lower than URLLC and eMBB.

A non-terrestrial network (NTN) refers to a network, or segment of networks using radio frequency (RF) resources onboard a satellite (or UAS platform). Non-Terrestrial Network typically features the following elements: one or several sat-gateways that connect the Non-Terrestrial Network to a public data network. For example, a Geostationary Earth Orbiting (GEO) satellite is fed by one or several sat-gateways which are deployed across the satellite targeted coverage (e.g., regional or even continental coverage). It may be assumed that wireless terminals in a cell are served by only one sat-gateway. A Non-GEO satellite served successively by one or several sat-gateways at a time. The system ensures service and feeder link continuity between the successive serving sat-gateways with sufficient time duration to proceed with mobility anchoring and hand-over.

Additionally, Non-Terrestrial Network typically features the following elements: a Feeder link or radio link between a sat-gateway and the satellite (or Unmanned Aircraft System (UAS) platform), a service link or radio link between the wireless terminal and the satellite (or UAS platform).

Additionally, Non-Terrestrial Network typically features the following elements: a satellite (or UAS platform) which may implement either a transparent or a regenerative (with onboard processing) payload. The satellite (or Unmanned Aircraft System (UAS) platform) may generate several beams over a given service area bounded by its field of view. The footprints of the beams are typically of elliptic shape. The field of view of a satellite (or UAS platform) depends on the onboard antenna diagram and min elevation angle. For a transparent payload, radio frequency filtering, frequency conversion and amplification may be applied. Hence, the waveform signal repeated by the payload is un-changed. For a regenerative payload, radio frequency filtering, frequency conversion and amplification as well as demodulation/decoding, switch and/or routing, coding/modulation may be applied. This is effectively equivalent to having all or part of base station functions (e.g., gNB) onboard the satellite (or UAS platform).

Additionally, Non-Terrestrial Network may optionally feature the following elements: Inter-satellite links (ISL) optionally in case of a constellation of satellites. This will require regenerative payloads onboard the satellites. ISL may operate in RF frequency or optical bands.

Additionally, Non-Terrestrial Network typically features the following elements: User Equipment may be served by the satellite (or UAS platform) within the targeted service area.

There may be different types of satellites (or UAS platforms): Low-Earth Orbit (LEO) satellite, Medium-Earth Orbit (MEO) satellite, Geostationary Earth Orbit (GEO) satellite, UAS platform (including High-Altitude Platform Station (HAPS) and High Elliptical Orbit (HEO) satellite). Detailed descriptions are shown in Table 1.

TABLE 1

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | Notional station keeping position fixed in terms of | 200-3500 km |
| UAS platform (including HAPS) | 8-50 km (20 km for HAPS) | elevation/azimuth with respect to a given earth point | 5-200 km |
| High Elliptical Orbit (HEO) satellite | 400-50000 km | Elliptical around the earth | 200-3500 km |

Typically, GEO satellites and UAS are used to provide continental, regional or local service. A constellation of LEO and MEO may be used to provide services in both Northern and Southern hemispheres. In some cases, the constellation can even provide global coverage including polar regions. For the later, this requires appropriate orbit inclination, sufficient beams generated and inter-satellite links.

Non-terrestrial networks may provide access to wireless terminal in six reference scenarios including: Circular orbiting and notional station keeping platforms, highest round trip delay (RTD) constraint, highest Doppler constraint, a transparent and a regenerative payload, one ISL case and one without ISL (Regenerative payload is mandatory in the case of inter-satellite links), fixed or steerable beams resulting respectively in moving or fixed beam foot print on the ground.

In typical Terrestrial Networks (TN) and previous studies, the uplink (UL) channels are normally the bottleneck that requires coverage enhancement, e.g. with repetitions.

Non-Terrestrial Networks (NTN) have good potential for ubiquitous coverage for 5G/6G networks. There are some fundamental restrictions for NTN communications including a large footprint of the satellite coverage and limited transmission power at the satellite. Thus, there is a need for DL coverage enhancement, so that an NTN satellite may limit the number of simultaneous transmitted beams to a reasonable threshold to provide desirable DL channel quality.

In the embodiments herein, an analysis is provided of the potential number of beams in a NTN coverage area, and the need to use beam group and/or beam pattern for NTN DL coverage enhancements.

Several beam groups and/or beam patterns design principles are provided, and the properties of each beam group and/or beam pattern design are analyzed, and the use cases and potential channels for the different beam group and/or beam pattern designs are provided.

Moreover, the NTN gNB/satellite cannot transmit to all beam groups at the same time, the User Equipment (UE) should only listen to the DL transmissions that has potential traffic to the UE, i.e. the beam group that includes the beam to the UE. Thus, some downlink control information can be introduced to indicate to UEs in a beam group or beam pattern on the timeslots that the gNB will transmit in the given beam group or beam pattern. Additionally, a separate time allocation pattern can be configured within the beam group to further reduce the DL monitoring instances for the UE.

Beam Group and/or Beam Pattern Designs for NTN DL Coverage Enhancement

The NTN satellite provides information to the gNB on the satellite ephemeris and the satellite capabilities, including antenna set configuration, the number of beams in the coverage area, available power, supported beam group and/or beam pattern type(s), the maximum number of beam groups and/or beam patterns, and the maximum number of beams in a beam group or beam pattern, the beam stability and beam angle fluctuations, etc.

The NTN gNB configures the beam groups and/or beam patterns based on the satellite capabilities, and schedules the transmissions based on the configured beam groups and/or beam patterns. The beam group and/or beam pattern parameters may include:

The total number of beams in the coverage area, and the number of regions in the coverage area if applicable.

The number of beam groups or beam patterns in the coverage area. The number of beam patterns can be configurable and may be different for different NTN satellites at different orbits or with different capabilities.

The types of beam patterns, and the beam pattern designs and configurations. The types can be a distributed pattern or a centralized pattern.

The number of beams in a beam pattern. The number of beams can be configurable and may be the same or different for different beam groups and/or beam patterns.

A distributed beam group or beam pattern may be defined by a beam distance among the closest beams.

The larger the distance, the more separation of beams in the pattern, and less interference among the beams.

To connect without gaps between adjacent beams, the distance can be defined with two non-negative integers i and j. To find the nearest beam of a beam in a beam pattern, move i cells along any chain of hexagons of a cell structure then, turn 60 degrees counter-clockwise and move j cells.

NTN UE Downlink Reception Time Indication with Beam Groups and or Beam Patterns

An NTN UE may detect only one beam at any given time and belongs to a given beam group or a beam pattern. An NTN UE should only listen to the DL transmissions that include potential traffic to the UE, i.e. the beam group and/or beam pattern that includes the beam to the given UE. This will significantly reduce the power consumption at the NTN UEs by not monitoring the timeslots targeted to other beam groups and/or beam patterns.

For DL reception, the NTN UE may not need to know the exact beam index or beam group index, but the UE needs to know a timeslot in a time domain pattern where the UE is required for potential data delivery. The gNB should ensure the corresponding beam group and/or beam pattern is applied in the given timeslot. The gNB can select a subset of beams in the beam group and/or beam pattern for actual DL transmissions.

Thus, some downlink control information can be introduced to signal the UEs in a beam group and/or beam pattern on the timeslots or time instances for DL reception. The UE can skip the DL receptions in other timeslots or time instances.

The control information may be beam group and/or beam pattern specific, and is applied to all UEs under a given beam group and/or beam pattern. Therefore, the information can be indicated in a broadcasting channel of the beam group and/or beam pattern, e.g. included in the Physical Broadcast Channel (PBCH) or another broadcast message in a Physical Downlink Control Channel (PDCCH) or a Physical Downlink Shared Channel (PDSCH), or a beam group and/or beam pattern specific Radio Resource Control (RRC) message.

The timeslots or time instances indication can be configured with a granularity of a slot, or a number of slots, or a number of symbols.

The indication may include at least a periodicity in a number of timeslots, and one or more timeslot offset indexes of the timeslots within the periodicity for DL reception.

The indication can be a bitmap, where the length of the bitmap is the periodicity, and each bit in the bitmap indicates whether the UEs should monitor the timeslot, e.g. a bit of 1 indicates the UEs should monitor the timeslot for DL reception, and a bit of 0 indicates the UEs do not need to monitor the timeslot for DL reception.

In a timeslot indicated for DL monitoring in a beam group and/or beam pattern, the gNB may schedule transmissions to UEs under a subset of beams in the given beam group and/or beam pattern in the timeslot.

the UEs under the beam group and/or beam pattern should monitor and receive the DL signals for potential data to them.

NTN DL Coverage Problems

In Release 17, a work item was carried out to define solutions enabling New Radio (NR) and NG-RAN to support Non-Terrestrial Networks (NTN). Then, Release 18 introduced enhancements for NR NTN. As part of Release 19, a new work item is proposed to define further enhancements for NG-RAN based Non-Terrestrial Networks in order to offer optimized performance especially when addressing handset terminals with respect to downlink coverage considering the NTN deployment constraints such as payload power limitation, large satellite footprint and limited feeder link bandwidth.

DL coverage enhancements are needed to accommodate satellite payload constraints which may be unable to have all its beams active with the nominal Effective Isotropic Radiated Power (EIRP) density per beam at a given time due to limited power and limited feeder link bandwidth, while maximizing the number of beams that can be activated simultaneously, and ensuring that all user terminals can be served across the satellite foot print while maximizing the overall satellite throughput and ensuring that all satellite's radio cells are kept alive even without traffic but allowing new users to join or preventing impact on end-user QoS.

FIG. 1 is a diagram 100 illustrating an example 100 of a non-terrestrial network (NTN) coverage area with a plurality of beams. The Next Generation Radio Access Network (NG-RAN) 102 includes an NTN-Platform 104 in communication with an NTN-Gateway 108 through a 5G air interface, such an NR-Uu 106 (New Radio User Equipment (UE) to the NR Node B (gNB) radio interface). The NG-RAN 102 also includes a base station device (gNB) 110. The gNB 110 includes an S-gNB-CU (Secondary gNodeB Control Unit) 112 and an S-gNB-DU (Secondary gNodeB Distributed Unit) 114 in communication with each unit via F1 interfaces.

The NTN coverage area includes a plurality of beams having footprints: beam footprints 1, 2, 3, . . . N (124, 126, 128, 130). The 5G Core network (5GC) 118 is in communication with the NG-RAN 102 and a data network 122, such as a global communications network or other data network.

Hence DL coverage enhancements are needed:

to maximize the number of beams that can be activated simultaneously through EIRP reduction compared to the nominal EIRP density per beam.

to ensure that all user terminals can be served across the satellite footprint through dynamic power sharing between beams or different beam pattern/sizes (i.e., wide or narrow) to ensure that all the satellite footprints can be served with efficient use of the satellite resources (e.g., power, frequency, and time) while maximizing the overall throughput.

DL coverage enhancements should be considered at both:

Link level to improve the link margin of selected physical channels in order to accommodate the EIRP reduction in FR1-NTN. A link margin improvement for physical channels (e.g. PDSCH and PDCCH) may be considered without impact on SSB design.

System level to support an efficient dynamic and flexible power sharing between beams or different beam patterns/sizes (i.e., wide or narrow) across the satellite footprint for FR1-NTN and FR2-NTN.

For the deployment perspectives, all satellites for 5G satellite networks (operating in FR1 as well in FR2, and covering both GEO and NGSO constellations) to be deployed in the next 10 years are expected to be designed under the assumptions of optimized power, and hence there is a strong need to implement DL coverage enhancement techniques to optimize CAPEX and OPEX for a given targeted coverage.

Further enhancements may be specified for NG-RAN 102 based NTN (Non-Terrestrial Networks) with the following assumptions:

GSO (Geo Synchronous Orbit) and NGSO (Non-Geo Synchronous Orbit). NGSO includes Low Earth Orbit (LEO) and Medium Earth Orbit (MEO).

Earth fixed tracking area. Earth fixed & Earth moving cells for NGSO.

Frequency Division Duplexing (FDD) mode.

UEs with GNSS (Global Navigation Satellite Systems) capabilities.

In a frequency band above 10 GHz, both Terminal Type 1 (Electronic steering antenna) and Type 2 (Mechanical steering antenna) can be considered for GSO and NGSO.

Implicit compatibility to support HAPS (High Altitude Platform Station) and ATG (Air To Ground) scenarios, where relevant.

A "VSAT" device with external antenna on a moving platform is equivalent to a device that operates on platforms in motion, and this is referred to as ESIM (Earth Station In Motion).

An objective is to study and specify if beneficial downlink coverage enhancements targeting support for additional reference satellite payload parameters covering both GSO and NGSO constellations are operating in FR1-NTN or FR2-NTN.

Define additional reference satellite payload parameters assuming power sharing among satellite beams or different satellite beam patterns/sizes (i.e. wide or narrow) across the satellite footprint, such that satellite beams may not all be simultaneously active or may be active below the nominal EIRP density per satellite beam due to limited power and limited feeder link bandwidth.

Define the corresponding power sharing assumptions and necessary link level and system level evaluation methodology and relevant Key Performance Indicators (KPIs) for evaluations of the coverage, to allow for identification of physical channels/signals and system-level aspects that need enhancements and the corresponding needed improvements.

Study link level enhancements for FR1-NTN (e.g. for PDCCH, PDSCH) and/or system level enhancements for FR1-NTN and/or FR2-NTN, allowing dynamic and flexible power sharing between satellite beams or different satellite beam patterns/sizes (i.e. wide or narrow) across the satellite footprint.

Considerations for this objective:

SSB channel enhancement may not be considered.

Antenna gain of UE shall be assumed to be −5.5 dBi in case of smartphone in FR1-NTN, the UE is assumed to be a full duplex UE, and at least 2Rx are considered at the UE.

NGSO to be considered in priority: LEO Set-1 @600 km.

Release 18 network energy saving techniques should be considered as baseline in the system level study.

The link level may include possible techniques such as increased repetition scheme or equivalent techniques depending on the physical channel. The system level performance may be achieved by leveraging network energy saving techniques. For example, a total number of beams=1200 may be assumed for NGSO operating in FR1 band. This would correspond to the number of beams necessary to serve a satellite footprint at 300 min elevation with ~50 km diameter beam size.

As an example, consider in priority the TR 38.821 LEO set 1 @600 km scenario in FR1 (i.e., S-band). In the following, the rationale is presented for the identification of the aggregated EIRP in a satellite.

From TR 38.821 LEO S-band set1 @600 km, the nominal EIRP density per beam is 34 dBW/MHz, corresponding to a nominal EIRP 41 dBW per beam with 5 MHz allocated bandwidth.

Given this satellite altitude, the entire satellite footprint diameter is about 1500 km, assuming the target minimum elevation of 30°. In a first approximation, to cover this footprint area with regular beam size (about 50 km diameter from TR 38.821), the total number of satellite beams (124-130) to be generated is approximately 1200.

In order to generate all these beams, the hypothetical aggregate EIRP should be: 41 dBW+10 log 10(1200) =72 dBW. This RF power is very high and demanding in terms of on board complexity. In addition, this is leading to 1200×5 MHz=6 GHz of required feeder link spectrum, which is another strong challenge in terms of on-board processing bandwidth.

Reasonably, E=56 dBW of satellite aggregated power should be considered, leading to a maximum number of N=30 beams to be assumed with the nominal EIRP density.

E dBW=41 dBW+10 log 10 (N=30)=56 dBW

This leads to X=16 dB gap between the hypothetical and the reasonable aggregated EIRP.

This X=16 dB loss can be compensated by:

Partly X1 dB with a link margin improvement at link level to generate simultaneous more beams and hence increase the instantaneous satellite coverage.

Given that the SSB channel (that should not be impacted) features approximately a 9 dB link margin, it is acceptable to reduce this link margin to the minimum (i.e. 3 dB for system loss) hence requiring to improve the link margin of other physical channels to X1=6 dB.

With 6 dB link margin improvement, 120 beams could be generated simultaneously. With 120 corresponding to $N=30 \times 10^{\wedge}(X1=6/10)$.

Partly X2 dB with an active/total beam ratio of thanks to enhanced dynamic and flexible power sharing between beams. Here is the ratio=1/10.

Beam Group and/or Beam Pattern Designs for NTN DL Coverage Enhancement

As analyzed for LEO, the number of beams under the coverage can be as large as 1200, and each beam group or beam pattern may contain 120 beams that can be generated simultaneously. But the number of active beam transmissions with dynamic and flexible power sharing may only support 12 beams for simultaneous transmissions.

A beam group with a beam pattern includes the beams that may be simultaneously generated. The active beam transmissions can be limited to within a beam group or a beam pattern. The gNB can cyclically transmit among the beam groups/patterns so that the entire coverage area is served.

Based on the type of DL channels, some channels have better link margins, and may support a larger number of simultaneous beam transmissions. For example, the Synchronization Signal Blocks (SSBs) are considered to have sufficient performance and no enhancement is considered. The SSBs may be transmitted simultaneously to all beams in a beam group or beam pattern.

With a large number of beams, to effectively schedule data transmissions in the whole coverage area, beam patterns or beam groups are needed. A pre-defined or well defined beam pattern can be reused for different NTN satellites to provide easy scheduling at the gNB. With a well-defined beam pattern, the beam patterns may be generated by a formula or algorithm without complicated allocations among beams, the beam group index may be determined automatically based on the formula.

Several types of beam groups and/or beam patterns may be considered.

Distributed Beam Patterns with Equal Separation Among Beams

In one beam group and/or beam pattern design, the beams should have enough separation among them, i.e. distributed beam patterns are preferred. In a distributed beam pattern, the beams in the beam group or beam pattern have some minimum distances so that the interference among simultaneous transmitted beams can be reduced even if they are neighbor beams in the beam pattern.

Figures 2A, 2B, 2C:
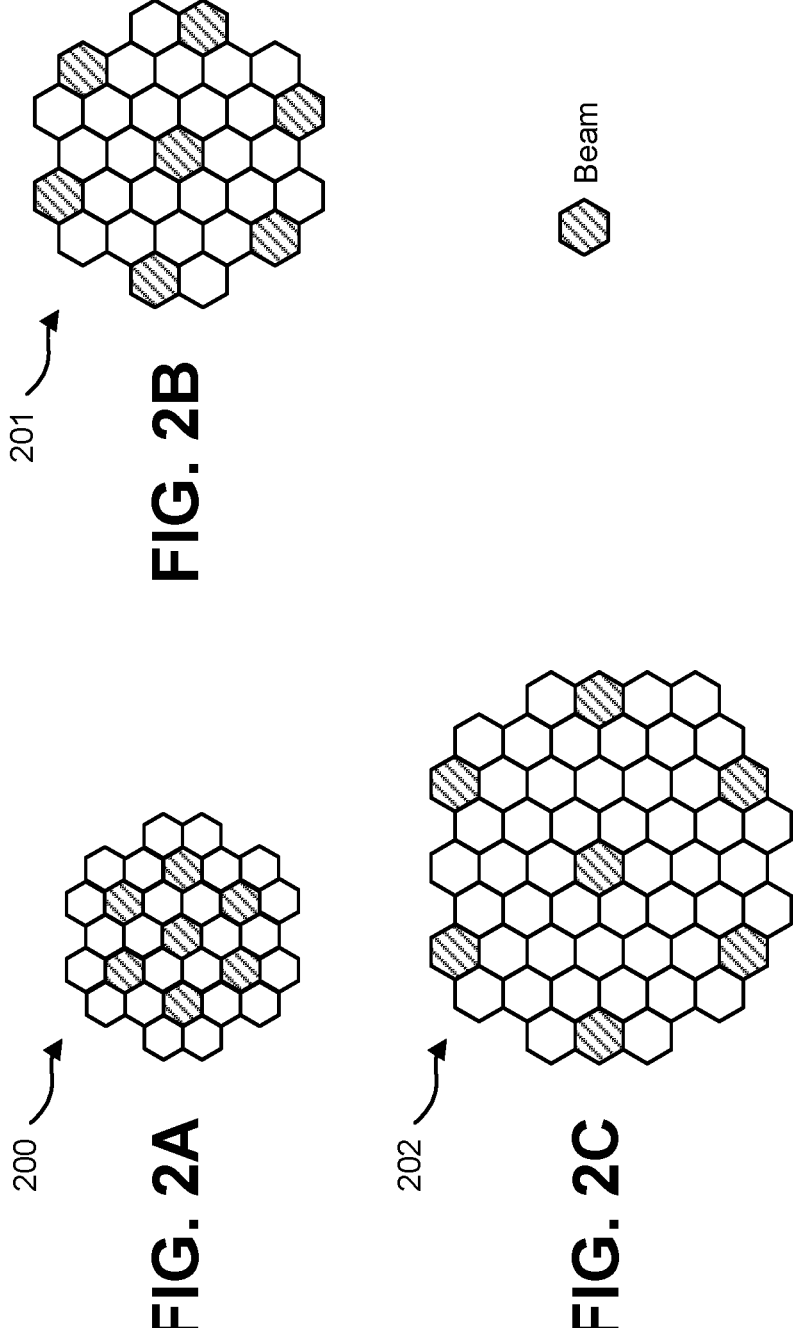
FIG. 2A is a diagram illustrating an example of beam patterns.
FIG. 2B is a diagram illustrating another example of beam patterns.
FIG. 2C is a diagram illustrating another example of beam patterns.

FIGS. 2A-2C show several sample beam patterns based on the cellular structure. The distributed pattern may be defined by a beam distance among the closest beams. The larger the distance, the more separation of beams in the pattern, and less interference among the beams. To connect without gaps between adjacent beams, the distance can be defined with two non-negative integers i and j. To find the nearest beam of a beam in a beam pattern, move i cells along any chain of hexagons then, turn 60 degrees counter-clockwise and move j cells.

In the example in FIG. 2A, beam pattern 200, i=j=1, the beam separation or beam distance is small, and using 3 beam patterns can cover a specific region. Note a specific region may be the whole NTN coverage area, or a section/part of the whole coverage area. For example, the whole coverage area can be divided into several regions, and beam patterns can be applied within each region.

Figure 6:
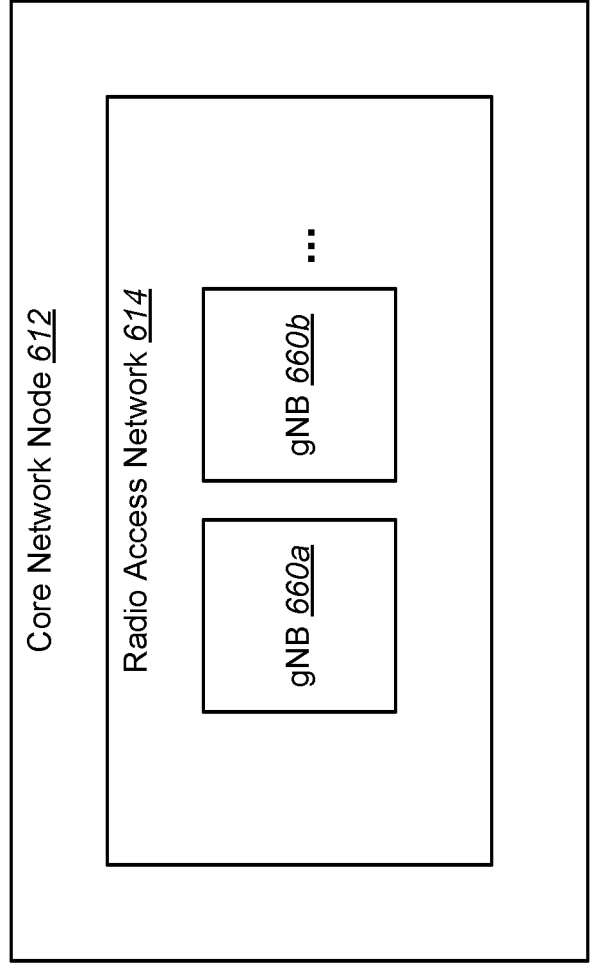
FIG. 6 is a block diagram illustrating one implementation of a core network node.

In the example in FIG. 2B, beam pattern 201, i=2, j=1, the beam separation or beam distance is larger than FIG. 2A, and 6 beam patterns are needed to cover a specific region. Similarly, the beam pattern 202 in FIG. 2C has i=2 and j=2 with even larger separation than FIG. 2B, thus more patterns (12 pattern in this example) are required to cover a specific region. And so on, different distributed patterns can be derived by different i and j values.

In summary, the larger beam separation of a beam pattern, the more beam patterns are needed to cover a specific region, and the less interferences among simultaneous beam transmissions in the pattern. Even with a distributed beam pattern, not all beams can be simultaneously transmitted. Thus, a subset of the beams in a distributed beam pattern can be selected for simultaneous transmissions with an even larger separation with a second level distributed beam pattern.

A distributed beam group or beam pattern can be applied to the whole NTN satellite coverage area. Thus, the total number of beams equals to the number of beam groups and/or beam patterns multiplied by the number of beams in a beam group and/or beam pattern.

Alternatively, the whole NTN satellite coverage area can be divided into several regions first, and the distributed patterns are then applied in each region. For example, the whole coverage area can be divided into 7 regions following the cellular concept, and distributed patterns are then applied in each region.

Centralized Beam Patterns

Figures 3A, 3B:
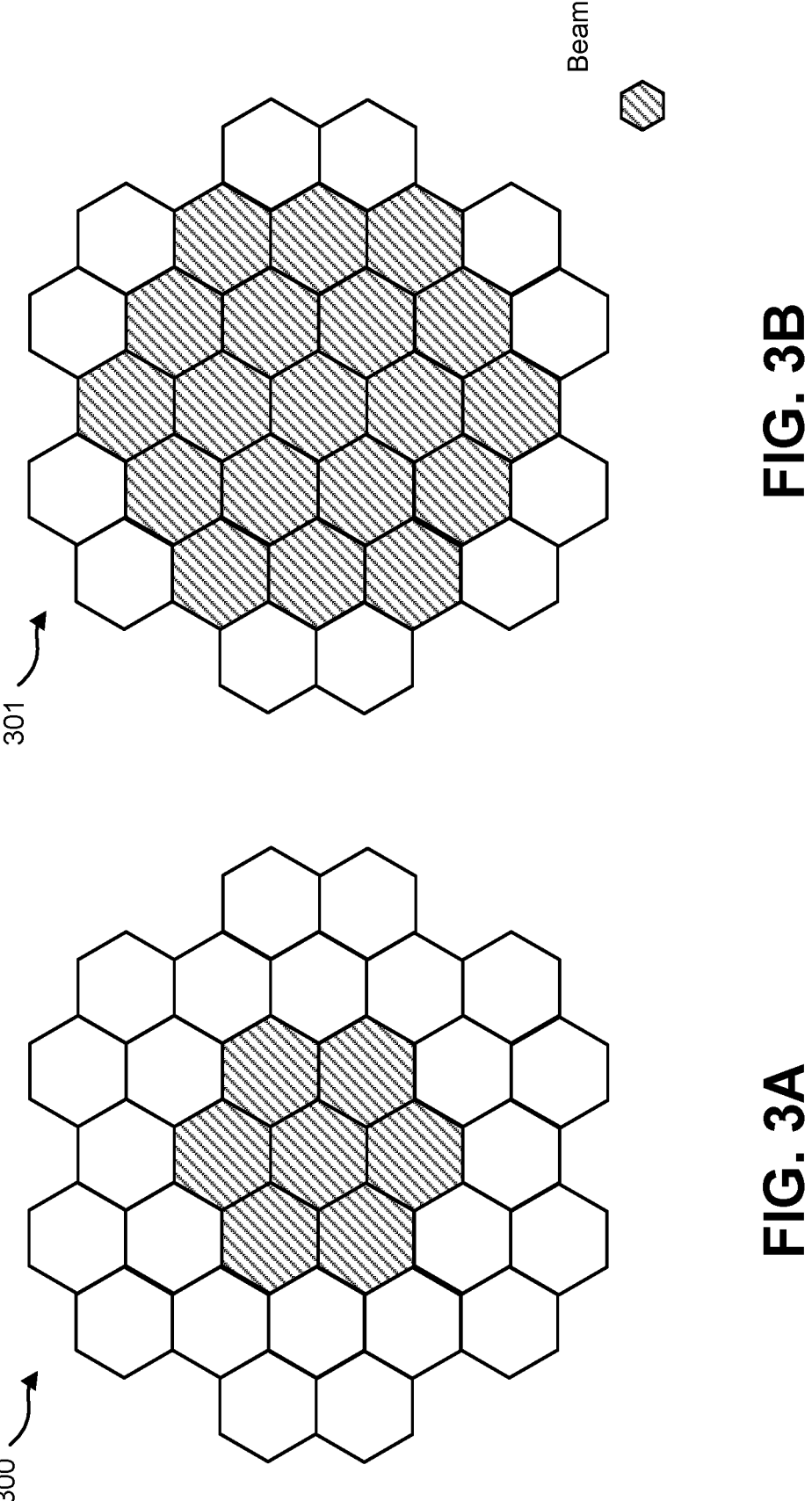
FIG. 3A is a diagram illustrating an example of a centralized beam pattern.
FIG. 3B is a diagram illustrating another example of a centralized beam pattern.

FIGS. 3A and 3B are diagrams illustrating examples of centralized beam patterns 300, 301. FIG. 3A illustrates one example of a centralized beam pattern 300. FIG. 3B illustrates another example of a centralized beam pattern 301 that covers a larger region than the centralized beam pattern 300 of FIG. 3A. Contrary to distributed beam patterns, a centralized beam pattern consists of adjacent beams in the group. Thus, the power can be concentrated in a smaller region. However, since there is less separation between the beams, the cross interferences from adjacent beams may degrade the NTN channel performance. A centralized beam pattern may also be achieved by a wide beam from the NTN satellite. But a wide beam cannot dynamically select a subset of the beams in the beam pattern for dynamic and flexible power sharing.

Even with a centralized beam pattern, not all beams can be simultaneously transmitted, especially for PDSCH transmissions. Thus, a subset of the beams in a centralized beam pattern can be selected for simultaneous transmissions with a distributed pattern as provided before.

Figure 4:
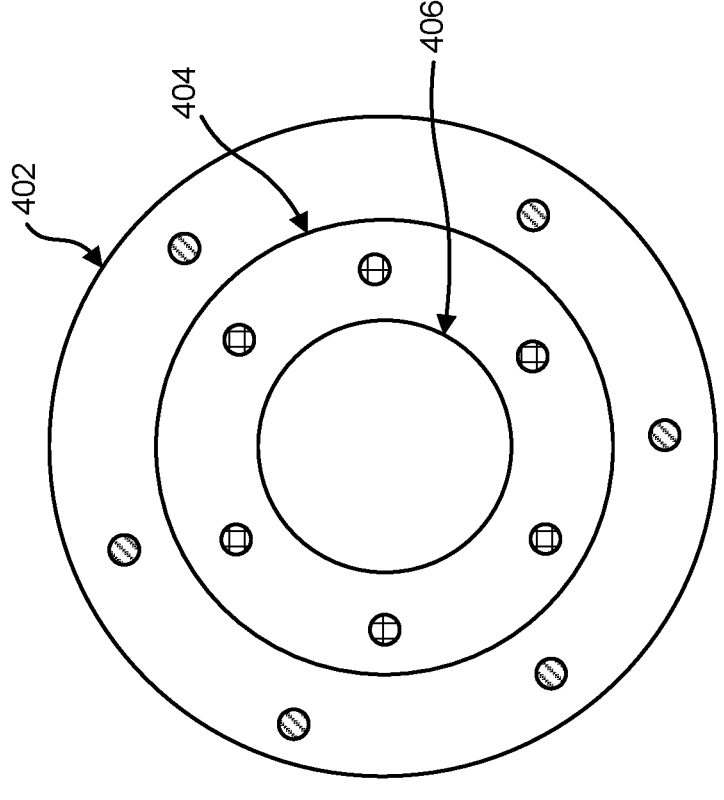
FIG. 4 is a diagram illustrating an example of a beam pattern based on the UE distance from an NTN satellite.
Figure 4:

Yet in another beam pattern design, the beams in a beam group or beam pattern are determined based on the distance from the NTN satellite, as shown in FIG. 4. FIG. 4 is a diagram illustrating an example of a beam pattern 400 based on the UE distance from an NTN satellite. FIG. 4 illustrates different UE distances from an NTN satellite using concentric circles 402, 404 and 406 where circle 404 represents a greater distance from the NTN satellite than circle 406, and circle 402 represents a greater distance than circle 404. In this design, the beams in a beam pattern have similar distance from the satellite, and thus similar downlink (DL) and uplink (UL) power and performance for NTN UEs in the same group/pattern. A beam group or beam pattern that is at the cell edge will have large beam separation; and a beam group or beam pattern that is at the cell center will have smaller beam separation. The number of beams in each beam group or beam pattern can be the same or different. For example, a cell edge beam group/pattern may be allocated with a smaller number of beams so that higher transmit power can be used to compensate attenuation from the longer distance.

Signaling of Beam Groups and/or Beam Patterns

As described above, for DL beam group and/or beam pattern design, several parameters should be determined and/or signaled at least between the gNB and the NTN satellite.

On the other hand, an NTN UE will detect only one beam and belongs to a single beam group or a beam pattern at any given time. The configurations and parameters for the beam group and/or beam pattern may be transparent to the NTN UE.

The beam group and/or beam pattern parameters include but are not limited to the following:

The total number of beams in the coverage area, and the number of regions in the coverage area if applicable.

The number of beam groups or beam patterns in the coverage area.

The types of beam patterns, and the beam pattern designs and configurations.

The number of beams in a beam pattern.

The number of beam groups and/or beam patterns can be configured. Ideally, different beam groups and/or beam patterns include a different subset of beams, and the coverage area is fully covered by the superset of all the beam groups and/or beam patterns. Additionally or alternatively, a beam may be included in more than one beam group or beam pattern. The number of beam groups and/or beam patterns may be configured separately from the SSB configurations. The number of beam groups and/or beam patterns may be configured together with the SSB configurations so that each beam group and/or beam pattern can be associated with an SSB index.

Several types of beam patterns can be specified, and different types of beam patterns can be used on different physical channels. For example, one type of beam groups and/or beam patterns are used for unicast services, and another type of beam groups and/or beam patterns are used for broadcast services.

The number of beams in a beam pattern can be config-ured. The number of beams in a beam pattern can be the same for all configured beam patterns. The number of beams in one beam pattern can be different from another beam pattern. In a more practical scenario, the actual number of beams in the beam patterns may not always be the same. Thus, the parameter may define the maximum number of beams in a beam group and/or beam pattern instead, the actual number of beams in a beam group and/or beam pattern can be smaller than or equal to the configured number of beams.

Compared with MEO and GEO, LEO has the lowest orbit, thus the smallest coverage areas. For LEO, with low orbit, the height is lower, and the transmission distance is shorter, and less transmit power may be required. A MEO satellite has larger coverage than LEO, and GEO has even larger coverage than MEO.

The higher the orbit, the larger the coverage area, the longer the transmission distance, and the higher transmit power is required to deliver the same amount of information/data. Also, a larger coverage area may require a higher number of beams for the coverage footprints, so the number of simultaneous transmitted beams may be reduced.

The coverage area is also impacted by the satellite trans-mit angles from the antenna set.

Therefore, the parameters related to beams and beam groups may be impacted and/or determined by the NTN satellite orbit and the NTN satellite capabilities, e.g. the available power, the antenna set configuration, and the type(s) of supported beam patterns. The information is necessary for the gNB to schedule the transmissions accord-ingly for each NTN satellite. An NTN gNB may connect to different NTN satellites at different times, the different NTN satellites may have different beam groups and/or beam patterns even if they are associated with the same NTN gNB. The satellite capability information may be reported to the NTN gNB. The gNB may configure the beam groups and/or beam patterns accordingly.

Procedures to Determine Beam Group and Beam Pattern Configuration

The NTN satellite provides information to the gNB on the satellite ephemeris, antenna set configuration, the number of beams in the coverage area, available power, supported beam group and/or beam pattern type(s), the capability on the maximum number of beam groups and/or beam patterns, and the maximum number of beams in a beam group or beam pattern, the beam stability and beam angle fluctua-tions, etc.

The NTN gNB configures the beam groups and/or beam patterns based on the satellite capabilities, and schedules the transmissions based on the configured beam groups and/or beam patterns.

SSB Configuration and Beam Identification in NR

To establish a suitable beam pair during the initial access phase, receiver side analog beam sweeping for the preamble reception is the key, especially for an NTN with thousands of beams. The UE measures the SS Blocks (SSBs) to determine the best beam for preamble transmission. Each SSB has a unique SSB index.

In NR, SSB stands for Synchronization Signal Block and more specifically refers to Synchronization/PBCH block because the Synchronization signal and the PBCH channel are packed as a single block that always move together. The Synchronization Signal includes PSS (Primary Synchroni-zation Signal) and SSS (Secondary Synchronization Signal).

The transmission of SS/PBCHs within an SS/PBCH set is confined to a 5 ms (milliseconds) window. Each SSBlock within an SSBlock Set (i.e., all of the SSblocks within the 5 ms period of the SSB transmission) is assigned with a unique number starting from 0 and increasing by 1. This number resets to 0 in the next SS Block Set (i.e, next 5 ms span after SSB transmission cycle (e.g, 20 ms). This unique number (i.e, SSBlock Index) is informed to the UE via two different SSBlocks within an SSBlock Set, one part is carried by PBCH Demodulation Reference Signal (DMRS) (i_SSB parameter), and another part is carried by PBCH payload.

The candidate SS/PBCH blocks in a half frame are indexed in an ascending order in time from 0 to L−1. A UE determines the 2 LSB (Least Significant Bit) bits, for L=4, or the 3 LSB bits, for L>4, of a SS/PBCH block index per half frame from a one-to-one mapping with an index of the Demodulation Reference Signal (DM-RS) sequence trans-mitted in the PBCH. For L=64, the UE shall determine the 3 MSB (Most Significant Bit) bits of the SS/PBCH block index per half frame by PBCH payload bits.

Multiple SSBs are being transmitted within a certain interval. Each SSB can be identified by a unique number called SSB index, and each SSB is transmitted via a specific beam radiated in a certain direction. The UE measures the signal strength of each SSB it detected for a certain period (a period of one SSB Set). From the measurement result, the UE can identify the SSB index with the strongest signal strength. The SSB with the strongest signal strength is the best beam for the UE.

How many different beams are being transmitted is deter-mined by how many SSBs are being transmitted within a SSB Burst Set (a set of SSBs being transmitted in 5 ms window of SSB transmission). The parameter defining the maximum number of SSBs within a SSB set is called the Lmax. In sub 6 Ghz, the Lmax is 4 or 8 and in mmWave, the Lmax is 64. In other words, in sub6 Ghz, a maximum of 4 or 8 different beams can be used, and they sweep in one dimension (horizontal only or vertical only). In mmWave a maximum of 64 different beams can be used and they can sweep in two dimensions (horizontal and vertical direc-tions).

Thus, the maximum number of SS/PBCHs within an SS/PBCH set (i.e., within 5 ms period) is specified to be 4 for frequency ranges up to 3 GHz, 8 for 3 to 6 GHz, or 64 for 6 to 52.6 GHz, in order to achieve a trade-off between coverage and resource overhead. Furthermore, the number of actual transmitted SS/PBCHs is configurable and could be less than the maximum number. This option is particularly useful towards reducing processing burden at the gNB, especially in the case of requiring transmission of multiple SS/PBCHs on multiple carriers within a slot.

SSB Beam Sweeping with NTN Beam Groups and/or Beam Patterns

Figures 5A, 5B:
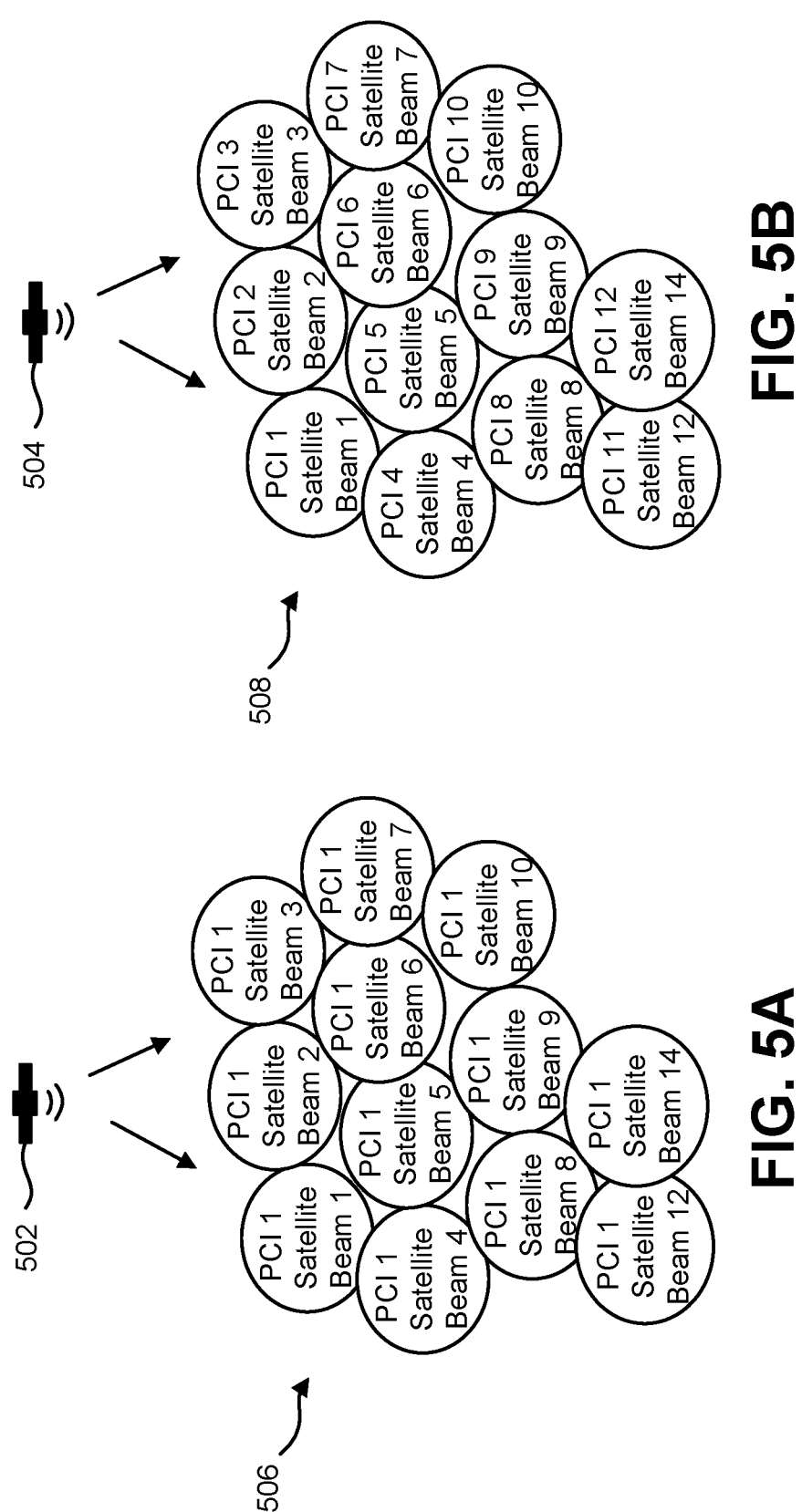
FIG. 5A is a diagram illustrating an example of PCI mapping onto satellite beams.
FIG. 5B is a diagram illustrating another example of PCI mapping onto satellite beams.

FIGS. 5A and 5B are diagrams illustrating an example of Physical Cell Identity (PCI) mapping onto satellite beams.

Satellite beams or satellites are not considered to be visible from a UE perspective in NTN. This does not preclude differentiating at the Public Land Mobile Network (PLMN) level the type of network (e.g. NTN vs. terrestrial). FIG. 5A shows a satellite 502 and the same PCI for several satellite beams 506, and FIG. 5B shows a satellite 504 and a different PCI for each satellite beam 508, and both can be considered in NTN. A satellite beam can consist of one or more SSB beams. One cell (PCI) can have maximum of L SSB beams, where L can be 4, 8, or 64 depending on the band. Similar to NTN, one or several SSB indexes can be used per PCI to separate SSB transmissions on different beams.

In NTN, there are potentially thousands of beams for the full coverage area. And it is impossible to configure SSBs for each individual beam. Thus, the beam group and/or beam pattern can be used as a beam in each SSB transmission. By connecting an SSB index with a specific beam group and/or a beam pattern, the UE can determine the beam group and/or beam pattern index. An NTN UE monitors SSB signals and determines the SSB index with the best signal quality that exceeds the rsrp-ThresholdSSB if configured. The NTN UE determines the DL beam index for the given SSB index.

By connecting a beam group and/or a beam pattern with a SSB index, the UE can determine the beam pattern index based on the SSB detection. After initial access, a specific beam for the UE in the beam group and/or beam pattern may be used, an even finer beam may be applied for a unicast DL transmission to a specific UE. Therefore, it is beneficial that the UE treats each SSB beam as a beam group and/or beam pattern. The concept may be specified in the standard. The parameters of the beam group and/or beam pattern may or may not be indicated to NTN UEs.

For the NTN satellite and gNB, each SSB index can be used to transmit multiple beams, e.g. beams for a beam group and/or beam pattern. Thus, from the NTN gNB point of view, each SSB time index is associated with a beam group and/or beam pattern, i.e. many different beams instead of one specific beam, e.g. a number of N beams in the beam group and/or beam pattern.

There may be up to a dozen or more beam groups and/or beam patterns for an NTN satellite. For a sub-6 GHz band, there may be more beam groups and/or beam patterns than the maximum number of SSBs. However, the satellite (502, 504) may be configured with one or more PCIs, and even beams with the same PCI can be divided into different non-overlapping sub-groups. The SSB index can be independently configured in each PCI group or a subgroup under the same PCI. And different PCIs and/or different subgroups under a PCI can use a different 5 ms frame location for SSB transmissions. Thus, the maximum number of SSBs within a SSB set can be reused as an implementation issue. Again, the number of actual transmitted SS/PBCHs is configurable and could be less than the maximum number.

NTN UE Downlink Reception Time Indication with Beam Groups and or Beam Patterns

For DL, the SSBs/PBCHs are assumed to be sufficient for coverage, thus no enhancement is required. With beam management, PDCCH and PDSCH coverages can be achieved by using a finer beam to the UE, reducing the number of simultaneously transmitted beams, and applying repetitions if necessary.

An NTN UE detects only one beam at any given time and belongs to a given beam group or a beam pattern. The configurations and parameters for the beam pattern may be transparent to the NTN UE. From a UE's perspective, a beam group or beam pattern may be the same as a beam in the legacy system. For DL reception, the NTN UE does not need to know the exact beam index or beam group index, but the UE needs to know a timeslot in a time domain pattern where UE is required for potential data delivery. The gNB should ensure the corresponding beam group and/or beam pattern is applied in the given timeslot. The gNB can select a subset of beams in the beam group and/or beam pattern for actual DL transmissions.

A suitable beam pair can be established by the NTN UE and the NTN satellite. For example, the UE may determine a beam index or a beam group and/or beam pattern index. The gNB needs to know not only the beam group and/or beam pattern index, but also the index and location of the specific beam in the beam group and/or beam pattern for each beam.

DL Reception Time Indication for Beam Groups and/or Beam Patterns

With beam groups and/or beam patterns, the NTN satellite/gNB can cyclically transmit in different beam groups and/or beam patterns. Especially for synchronization channels and some broadcast channels with better link budget, the gNB may transmit on all beams in a beam group and/or beam pattern. Thus, full coverage can be maintained if the set of beam groups and/or beam patterns include all beams in the coverage area. Furthermore, within a beam group and/or beam pattern, the gNB can restrict to a smaller or limited number of beams for simultaneous transmissions for dynamic and flexible power sharing to enhance the DL coverage.

Therefore, if possible, an NTN UE should only listen to the DL transmissions that contain potential traffic to the UE, i.e. the beam group and/or beam pattern that includes the beam to the given UE. This will significantly reduce the power consumption at the NTN UEs by not monitoring the timeslots targeted to other beam groups and/or beam patterns.

Thus, some downlink control information can be introduced to signal the UEs in a beam group and/or beam pattern on the timeslots or time instances for DL reception. The UE can skip the DL receptions in other timeslots or time instances.

The timeslots or time instances indication can be configured with a granularity of a slot, or a number of slots, or a number of symbols; and the indication should include at least the periodicity or the duration of the indication in a number of timeslots, and the timeslot offset index of the timeslot within the periodicity for a given beam group or beam pattern.

Beam Group and/or Beam Pattern Specific Indication

In one approach, the control information may be beam group and/or beam pattern specific, and is applied to all UEs under the beam group and/or beam pattern. Therefore, the information can be indicated in a broadcasting channel of the beam group and/or beam pattern, e.g. included in the PBCH or another broadcast message in a PDCCH or a PDSCH, or a beam group and/or beam pattern specific RRC message.

Since the UEs can only receive from the given beam group, the UE does not need to know the beam group and/or beam pattern index. Thus, the time pattern indication can be very flexible. The indication can be represented in several methods.

In one method, the indication includes at least a periodicity in a number of timeslots, and a timeslot offset index of the timeslot within the periodicity for DL reception. The timeslot offset index starts from 0, and has a range from 0 to (periodicity−1). The timeslots or time instances indication can be configured with a granularity of a slot, or a number of slots, or a number of symbols. For example, for a given beam group and/or beam pattern, if a DL time allocation indication with a period of 10 and an index of 3 is indicated, the UEs in the beam group and/or beam pattern should monitor and receive DL signals in the timeslot with slot index 3 in every 10 timeslots.

Additionally, more than one timeslot can be indicated with more than one offset index values so that the UEs may perform DL reception in more than one slot in a period. For example, for a given beam group and/or beam pattern, if a DL time allocation indication with a period of 12 and an index of 3 and 8 is indicated, the UEs in the beam group and/or beam pattern should monitor and receive DL signals in the timeslot with timeslot index 3 and timeslot index 8 in every 12 timeslots. More than one timeslot indication provides more scheduling flexibility for the gNB, e.g. based on the traffic load in different beam groups and/or beam patterns. The gNB may also indicate the same timeslot index to multiple beam groups and or beam patterns, and dynamically schedules which beam group and/or beam pattern is applied for DL transmission.

In another method, the indication can be a bitmap. The length of the bitmap is the periodicity in a number of timeslots, and each bit in the bitmap indicates whether the UEs should monitor the timeslot, e.g. a bit of 1 indicates the UEs should monitor the timeslot for DL reception, and a bit of 0 indicates the UEs do not need to monitor the timeslot for DL reception. The bitmap should include at least one slot indicated as 1, and potentially more than one slot may be indicated as 1.

Although transparent to UEs, the gNB can configure the periodicity and/or the length of the bitmap based on the number of beam groups and/or beam patterns.

In one case, the number of timeslots in a period is the same as the number of beam groups and/or beam patterns; thus, each beam group and/or beam pattern should be indicated at least once in a period for DL reception. For example, assume there are 10 beam groups and/or beam patterns for the NTN satellite, one beam group and/or beam pattern that is configured with a bitmap of 0010000000 means that the UEs in the beam group and/or beam pattern need to receive DL in the 3rd timeslot (i.e. Timeslot index 2) every 10 timeslots. And another beam group and/or beam pattern can be configured with a bitmap of 0000001000, meaning that the UEs in the beam group and/or beam pattern need to receive DL in the 7th timeslot (i.e. Timeslot index 6) every 10 timeslots.

In another case, the number of timeslots in a period may be larger than the number of beam groups and/or beam patterns; thus, gNB may allocate more timeslots to a beam group and/or beam pattern with higher traffic load, i.e. more than one timeslot may be indicated for a beam group and/or beam pattern. For example, assume there are 10 beam groups and/or beam patterns for the NTN satellite, and the bitmap has 12 bits. One beam group and/or beam pattern that is configured with a bitmap of 001000000000 means that the UEs in the beam group and/or beam pattern need to receive DL in the 3rd timeslot (i.e. Timeslot index 2) every 12 timeslots. And another beam group and/or beam pattern can be configured with a bitmap of 000000110000, meaning that the UEs in the beam group and/or beam pattern need to receive DL in the 7th and 8th timeslots every 12 timeslots.

Additionally, the gNB may indicate DL reception in multiple beam groups and/or beam patterns in a timeslot, and dynamically schedule transmissions based on the traffic load from the beam groups and/or beam patterns. Thus, yet in another case, the number of timeslots in a period may be smaller than the number of beam groups and/or beam patterns. For example, assume there are 10 beam groups and/or beam patterns for the NTN satellite, and the bitmap has only 8 bits. Two beam groups and/or beam patterns may be configured with the same bitmap of 00100000. Thus, the UEs in both beam groups and/or beam patterns need to receive DL in the 3rd timeslot (i.e. Timeslot index 2) every 8 timeslots. The gNB may choose which beam group and/or beam pattern is used for DL transmission based on the traffic load.

SSB Configuration Specific Indication

In another approach, the control information may be applied to the beam groups and/or beam patterns under the same SSB configuration. If all beam groups and/or beam patterns are configured with a single SSB structure, the information may be NTN satellite specific or cell specific, and may be applied to all UEs in the cell.

The information can be indicated in a broadcasting channel in all beam groups and/or beam patterns in a SSB structure, e.g. included in the PBCH or another broadcast message in a PDCCH or a PDSCH, or a cell specific RRC message.

With this approach, each beam group and/or beam pattern may be associated with a SSB index in the SSB structure. Thus, the beam group and/or beam pattern index is determined by the SSB index. The UE can determine its own beam group and/or beam pattern index based on the detected SSB index.

In one method, the DL reception indication may be derived implicitly based on the SSB configurations. Thus, the beam groups and/or beam patterns are cyclically transmitted based on the index order. The periodicity of the cyclic beam group and/or beam pattern transmissions is determined by the number of SSBs in a burst of synchronization signal transmissions. The UE can determine the slots for DL reception after initial access, e.g. in each period, the UE monitors the slot with a slot offset value determined by the beam group and/or beam pattern index. Additionally or alternatively, the gNB may configure a timeslot granularity for the beam group and/or beam pattern cyclic transmissions. The timeslot granularity may be in a number of slots, or a number of symbols. With implicit indication of beam group and/or beam pattern reception, the timeslots for each beam group and/or beam pattern is fixed. Thus, the NTN gNB will have less scheduling flexibility. In a timeslot for one beam group and/or beam pattern, if the gNB transmits with another beam group and/or beam pattern, the UEs in the other beam group and/or beam pattern may not monitor the channel for the DL reception.

Thus, in another method, an explicit indication can be used to explicitly indicate which beam group and/or beam pattern will be used in a timeslot. The indication includes at least a periodicity in a number of timeslots, and the beam group and/or beam pattern index to be transmitted in each timeslot. Additionally, more than one beam group and/or beam pattern indexes may be indicated in a timeslot for better scheduling flexibility by the gNB. The timeslots or time instances indication can be configured with a granularity of a slot, or a number of slots, or a number of symbols.

In all approaches and methods, in a timeslot indicated for DL monitoring in a beam group and/or beam pattern, the gNB may schedule transmissions to UEs under a subset of beams in the given beam group and/or beam pattern in the timeslot.

the UEs under the beam group and/or beam pattern should monitor and receive the DL signals for potential data to them.

FIG. 6 is block diagram illustrating one implementation of a core network node 612. The core network node 612 may include a radio access network 614 that includes a plurality of gNBs (gNB 660a, 660b). Messages transmitted and received by the core network node 612 may be transmitted and received by the gNBs 660a, 660b in the radio access network 614. The core network node 612 may be part of the 5GC 118 or the NG-RAN 102.

Figure 7:
FIG. 7 is a block diagram illustrating one implementation of a gNB.

FIG. 7 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a wireless terminal's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 Uplink Control Information (UCI). The PUSCH receiver 1137 may provide the higher layer processor 1123 received transport blocks.

Figure 8:
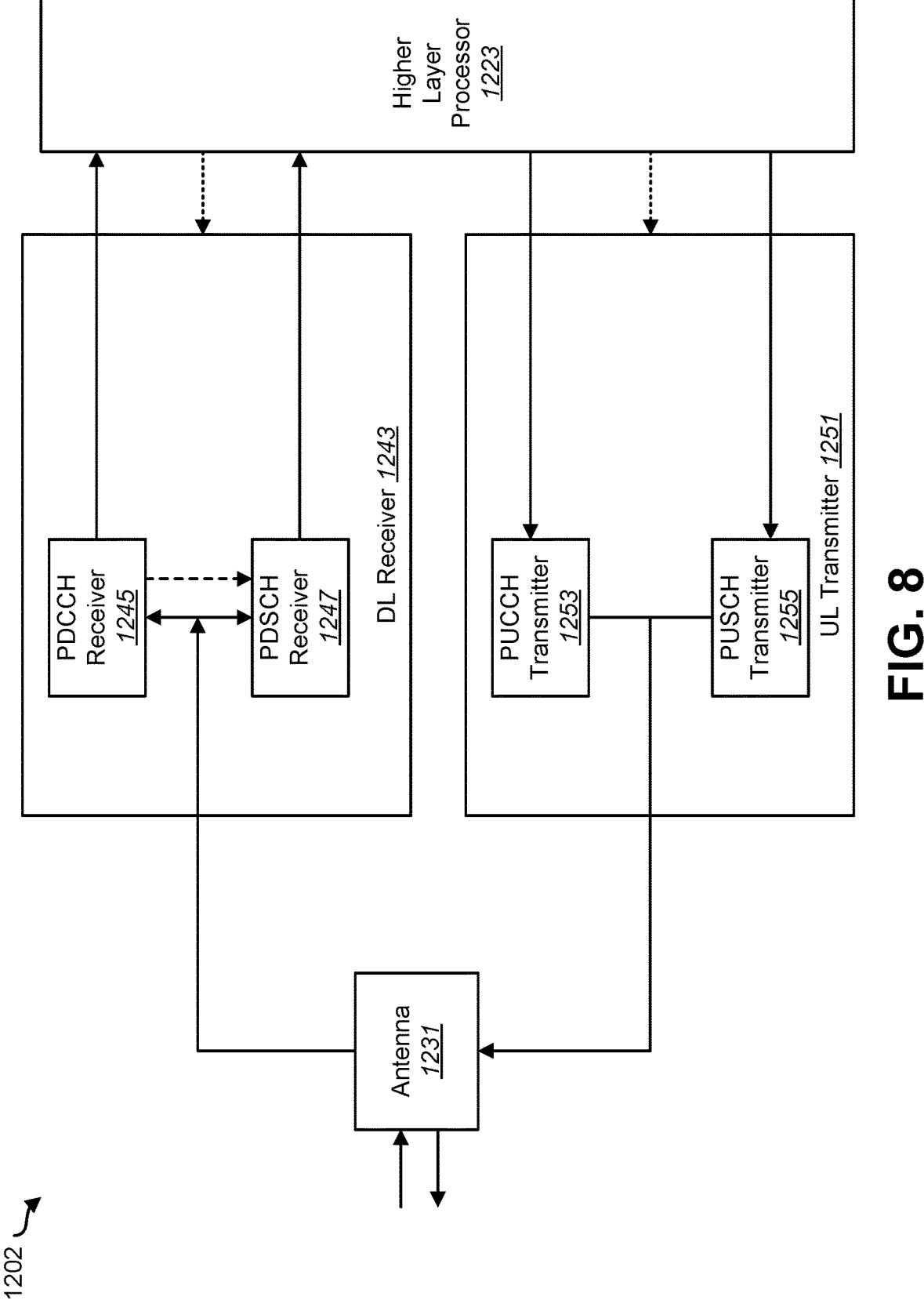
FIG. 8 is a block diagram illustrating one implementation of a wireless terminal.

FIG. 8 is a block diagram illustrating one implementation of a wireless terminal 1202. The wireless terminal 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a wireless terminal's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI (Downlink Control Information). The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 9:
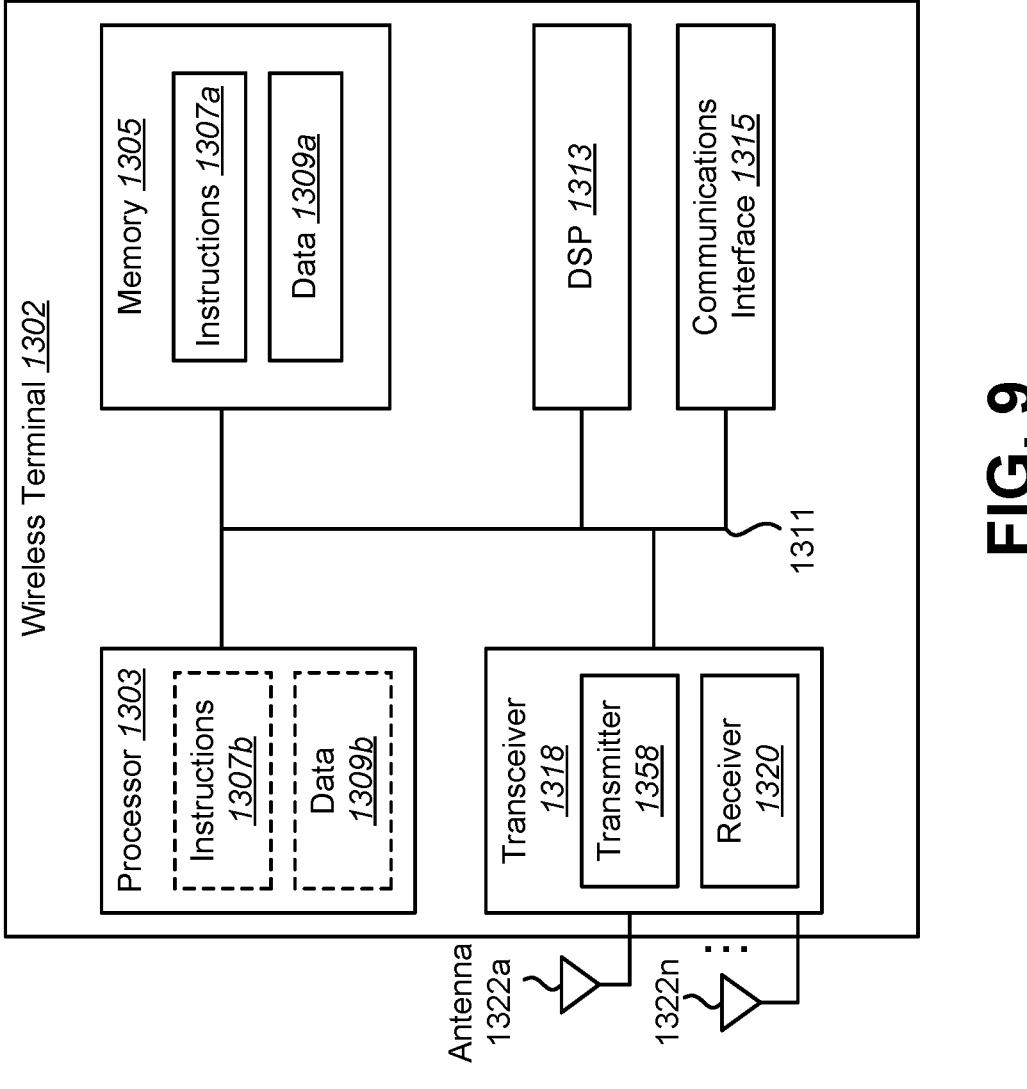
FIG. 9 illustrates various components that may be utilized in a wireless terminal.

FIG. 9 illustrates various components that may be utilized in a wireless terminal 1302. The wireless terminal 1302 described in connection with FIG. 9 may be implemented in accordance with the wireless terminal described herein. The wireless terminal 1302 includes a processor 1303 that controls operation of the wireless terminal 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The wireless terminal 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the wireless terminal 1302 are coupled together by a bus system 1311, which may include a power bus, a control signal bus and a status signal bus, in addition to a data bus. However, for the sake of clarity, the various buses are illustrated in FIG. 9 as the bus system 1311. The wireless terminal 1302 may also include a digital signal processor (DSP) 1313 for use in processing signals. The wireless terminal 1302 may also include a communications interface 1315 that provides user access to the functions of the wireless terminal 1302. The wireless terminal 1302 illustrated in FIG. 7 is a functional block diagram rather than a listing of specific components.

Figure 10:
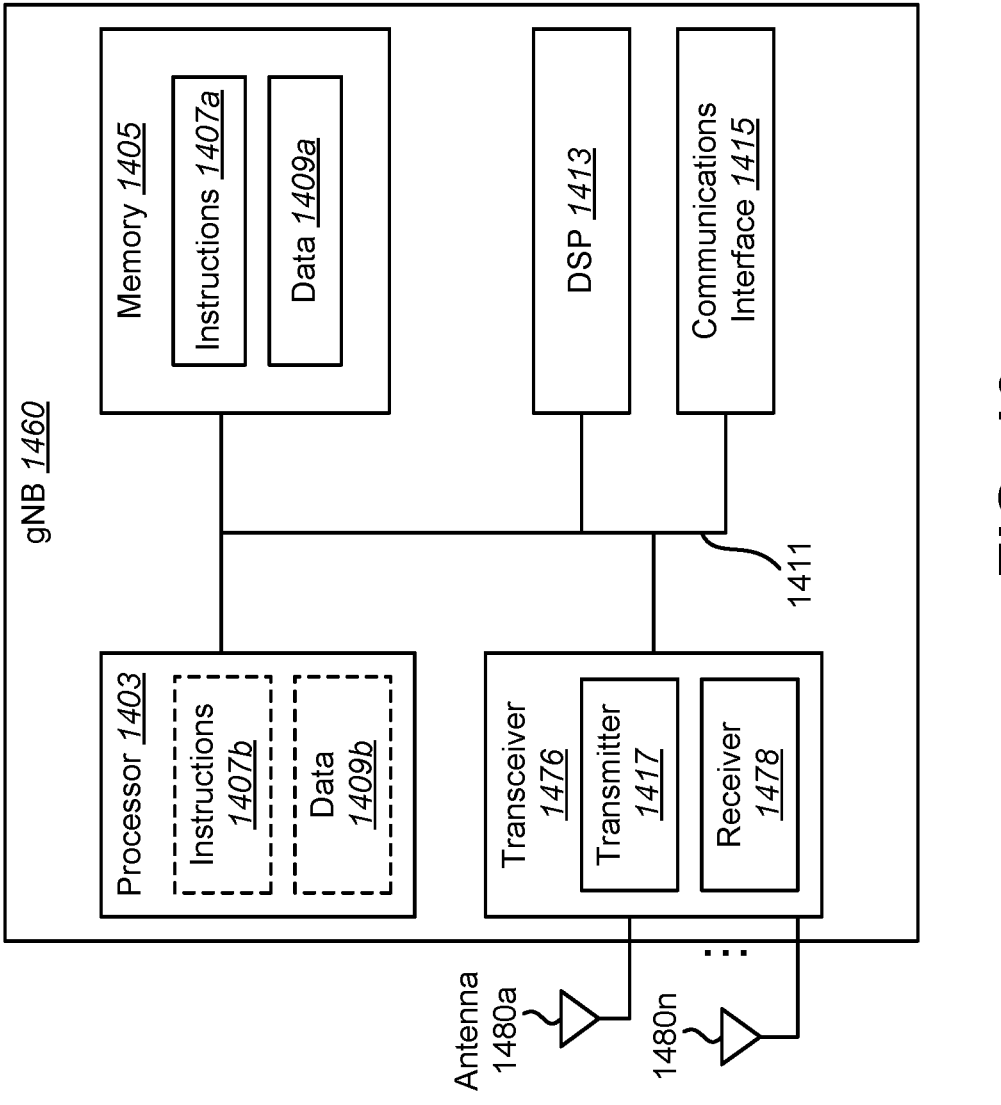
FIG. 10 illustrates various components that may be utilized in a gNB.

FIG. 10 illustrates various components that may be utilized in a gNB 1460. The gNB 1460 described in connection with FIG. 7 may be implemented in accordance with the gNB described herein. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random-access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 8 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 10 is a functional block diagram rather than a listing of specific components.

Figure 11:
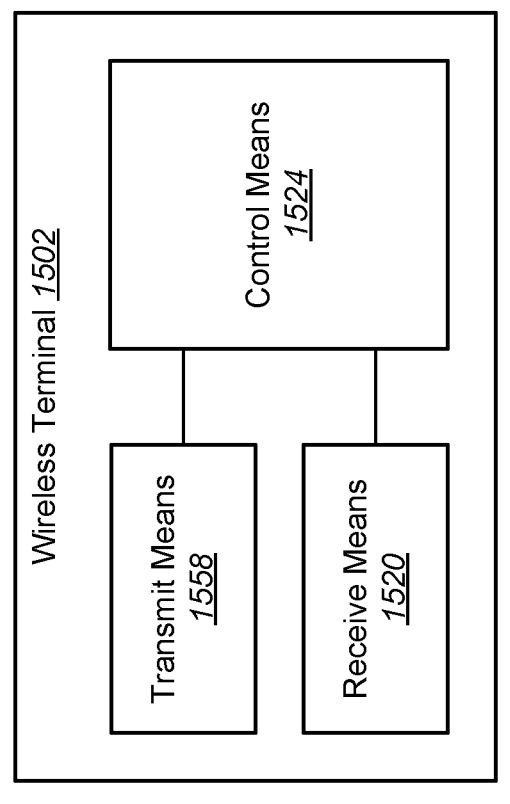
FIG. 11 is a block diagram illustrating one implementation of a wireless terminal in which the present systems and methods may be implemented.

FIG. 11 is a block diagram illustrating one implementation of a wireless terminal 1502 in which systems and methods for resource allocations of enhanced uplink transmissions may be implemented. The wireless terminal 1502 includes transmit means 1558, receive means 1520 and control means 1524. The transmit means 1558, receive means 1520 and control means 1524 may be configured to perform one or more of the functions described herein. FIG. 9 above illustrates one example of a concrete apparatus structure of FIG. 11. Other various structures may be implemented to realize one or more of the functions herein. For example, a DSP may be realized by software.

Figure 12:
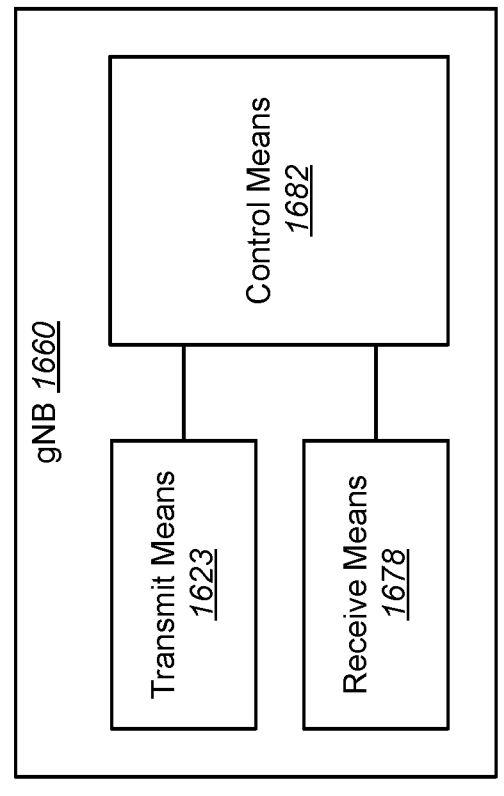
FIG. 12 is a block diagram illustrating one implementation of a gNB in which the present systems and methods may be implemented.

FIG. 12 is a block diagram illustrating one implementation of a gNB 1660 in which systems and methods for resource allocations of enhanced uplink transmissions may be implemented. The gNB 1660 includes transmit means 1623, receive means 1678 and control means 1682. The transmit means 1623, receive means 1678 and control means 1682 may be configured to perform one or more of the functions described herein. FIG. 10 above illustrates one example of a concrete apparatus structure of FIG. 12. Other various structures may be implemented to realize one or more of the functions described herein. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB or the wireless terminal according to the described systems and methods is a program (a program for causing a computer to operate) that controls a CPU and the like in such a manner as to realize the function according to the described systems and methods. Then, the information that is handled in these apparatuses is temporarily stored in a RAM while being processed.

Thereafter, the information is stored in various ROMs or Hard Disk Drives (HDDs), and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB and the wireless terminal according to the systems and methods described above may be realized as an LSI that is a typical integrated circuit. Each functional block of the gNB and the wireless terminal may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE), comprising:

receiving circuitry configured to:

monitor SSBs/PBCHs (synchronization signal blocks/physical broadcast channels) and obtain system information block type 1 (SIB1) information;

receive downlink (DL) control information on a DL reception timeslot pattern indication for a beam group and/or beam pattern in a non-terrestrial network (NTN); and receive DL signals and detect potential data to the UE in indicated timeslots following the DL reception timeslot pattern.

2. The UE of claim 1, wherein a timeslot in the DL reception timeslot pattern is configured with a granularity of a slot, or a number of slots, or a number of symbols.

3. The UE of claim 1, wherein the DL reception timeslot pattern indication includes a periodicity in a number of timeslots, and one or more timeslot offset indexes of the timeslots within the periodicity for DL reception.

4. The UE of claim 1, wherein the DL reception timeslot pattern indication is defined as a bitmap, wherein a length of the bitmap is a periodicity, and wherein each bit in the bitmap indicates whether the UE should monitor the timeslot.

5. The UE of claim 4, wherein in the bitmap of the DL reception timeslot pattern indication, a bit of 1 indicates the UE is to monitor the timeslot for DL reception, and a bit of 0 indicates the UE does not need to monitor the timeslot for DL reception.

6. A base station (gNB), comprising:

transmitting circuitry configured to:

transmit SSBs/PBCHs (synchronization signal blocks/physical broadcast channels);

configure downlink (DL) control information on a DL reception timeslot pattern indication for a beam group and/or beam pattern in a non-terrestrial network (NTN); and schedule and transmit DL signals to user equipments (UEs) in beams in the beam group and/or beam pattern following the DL reception timeslot pattern.

7. The gNB of claim 6, wherein a timeslot in the DL reception timeslot pattern is configured with a granularity of a slot, or a number of slots, or a number of symbols.

8. The gNB of claim 6, wherein the DL reception timeslot pattern indication includes a periodicity in a number of timeslots, and one or more timeslot offset indexes of the timeslots within the periodicity for DL reception.

9. The gNB of claim 6, wherein the DL reception timeslot pattern indication is defined as a bitmap, wherein a length of the bitmap is a periodicity, and wherein each bit in the bitmap indicates whether the UEs should monitor the timeslot.

10. The gNB of claim 9, wherein in the bitmap of the DL reception timeslot pattern indication, a bit of 1 indicates the UEs in the beam group and/or beam pattern are to monitor the timeslot for DL reception, and a bit of 0 indicates the UEs in the beam group and/or beam pattern do not need to monitor the timeslot for DL reception.

11. A method by a user equipment (UE), comprising:

monitoring SSBs/PBCHs (synchronization signal blocks/physical broadcast channels);

obtaining system information block type 1 (SIB1) information;

receiving downlink (DL) control information on a DL reception timeslot pattern indication for a beam group and/or beam pattern in a non-terrestrial network (NTN);

receiving DL signals; and detecting potential data to the UE in indicated timeslots following the DL reception timeslot pattern.

* * * * *